United States Patent [19]

Allen

[11] E Re. 29,626

[45] Reissued May 9, 1978

[54] POSITIVE DISPLACEMENT ROTARY PUMP AND DRIVE COUPLING THEREFOR

[76] Inventor: Clifford H. Allen, 13109 Westchester Trail, Chesterland, Ohio 44026

[21] Appl. No.: 763,063

[22] Filed: Jan. 27, 1977

Related U.S. Patent Documents

Reissue of:

[64] Patent No.: 3,938,744
Issued: Feb. 17, 1976
Appl. No.: 503,380
Filed: Sep. 5, 1974

[51] Int. Cl.[2] ..... B02C 18/40; F01C 5/04; F04C 15/00

[52] U.S. Cl. ..... 241/46.11; 418/48; 418/182

[58] Field of Search ..... 418/48, 153, 182, 220, 418/270, 55; 241/46.11

[56] References Cited

U.S. PATENT DOCUMENTS

| | | | |
|---|---|---|---|
| 2,028,407 | 1/1936 | Moineau | 418/48 |
| 2,212,417 | 8/1940 | George | 418/182 X |
| 2,456,227 | 12/1948 | Wade | 418/48 |
| 2,527,673 | 10/1950 | Byram | 418/48 |
| 3,307,486 | 3/1967 | Lindberg | 418/48 |
| 3,512,904 | 5/1970 | Allen | 418/48 |
| 3,612,734 | 10/1971 | Dawson | 418/48 |
| 3,667,692 | 6/1972 | Grace | 241/36 |
| 3,857,517 | 12/1974 | Grace et al. | 241/36 |

FOREIGN PATENT DOCUMENTS

| | | | |
|---|---|---|---|
| 2,139,013 | 2/1973 | Germany | 418/48 |
| 1,379,907 | 1/1975 | United Kingdom | 418/48 |

*Primary Examiner*—Carlton R. Croyle
*Assistant Examiner*—Leonard Smith
*Attorney, Agent, or Firm*—Bosworth, Sessions & McCoy

[57] ABSTRACT

A progressing cavity, positive displacement rotary pump assembly for fluid or semi-fluid material. The assembly includes a rotary shaft with an associated drive motor and pump components including a tubular stator with an interior helical surface and an orbital rotor within the stator operably connected to the shaft and having an exterior helical surface. The helical rotor surface has one more thread than the helical stator surface which it engages, to define sealed pumping cavities that advance axially as the rotor rotates and orbits within the stator. The rotor is coupled to the shaft by a flexible torque tube with one end connected to the shaft and the other connected to an end of the rotor to transmit driving torque to the rotor and to flex sufficiently to accommodate orbital movement of the rotor.

9 Claims 11 Drawing Figures

FIG. 2
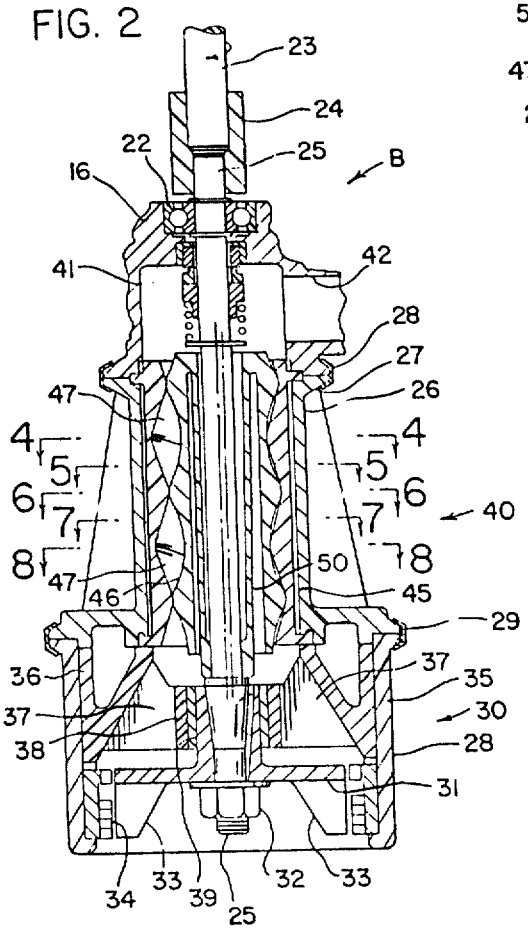
FIG. 3
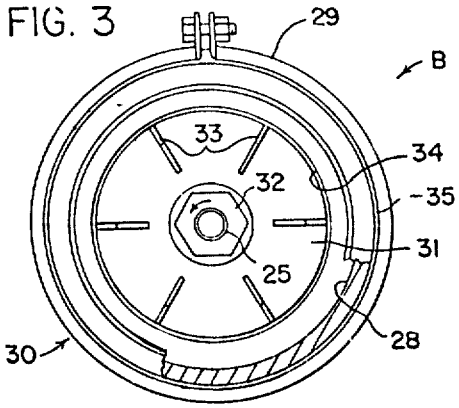
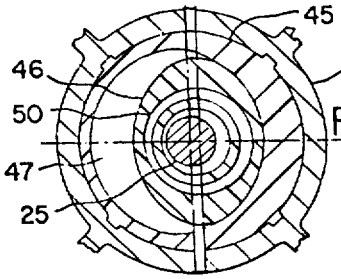
FIG. 4
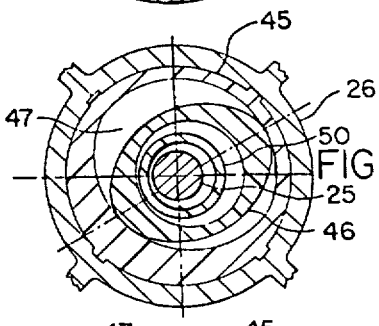
FIG. 5
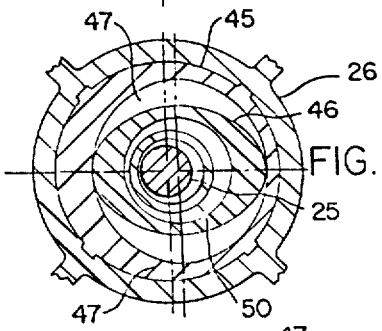
FIG. 6
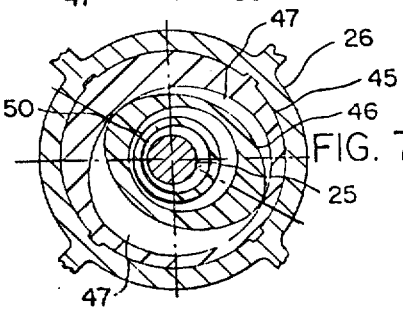
FIG. 7
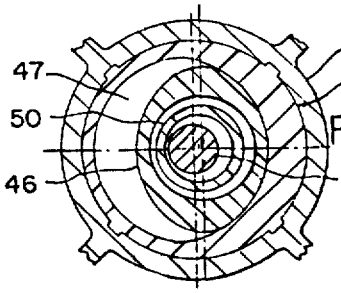
FIG. 8

FIG. 9
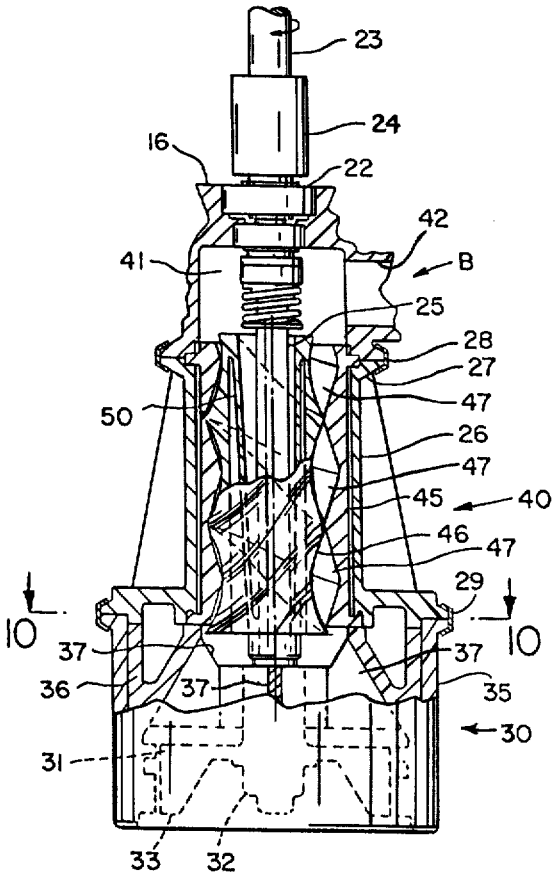
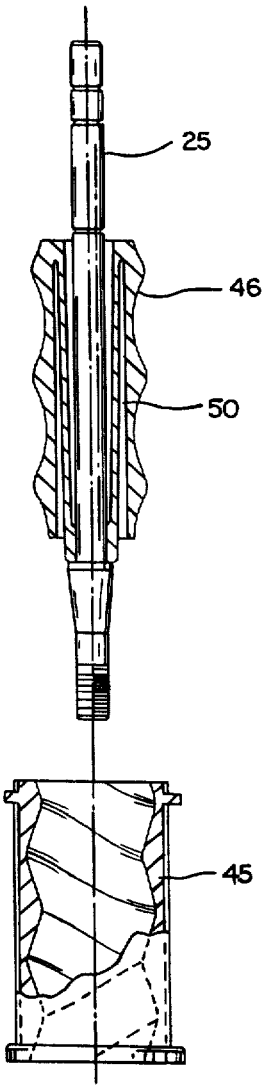
FIG. 11
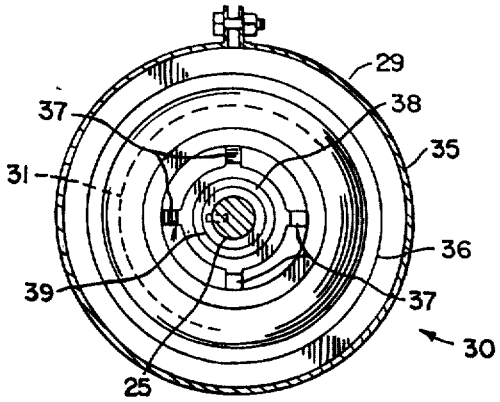
FIG. 10

POSITIVE DISPLACEMENT ROTARY PUMP AND DRIVE COUPLING THEREFOR

Matter enclosed in heavy brackets [ ] appears in the original patent but forms no part of this reissue specification; matter printed in italics indicates the additions made by reissue.

BACKGROUND OF THE INVENTION

This invention relates to progressing-cavity-type positive displacement helical pumps for handling fluid, semi-fluid and comminuted material, such as the progressing cavity helical pump of my U.S. Pat. No. 3,512,904. More particularly, the invention relates to an improved means for flexibly coupling the orbiting rotor for the pump to the rotary drive therefor.

Progressing-cavity-type positive displacement rotary devices of the general class that includes the device disclosed in my U.S. Pat. No. 3,512,904 (hereinafter referred to as "Allen" devices or pumps) have a rotor with an exterior helical surface that engages the surrounding interior helical surface of the stator, the rotor surface having one more thread than the stator surface and a lead twice that of the stator surface. Thus, the stator surface and rotor surface define therebetween sealed pumping cavities that are axially advanced as the rotor rotates and at the same time orbits in the same direction at two or more times the rate of its rotation. For a more complete description of pumps of this type, reference is made to my aforesaid U.S. Pat. No. 3,512,904.

This class of rotary helical devices differs from the well known Moineau type device as disclosed, for example, in U.S. Pat. No. 1,892,217. In the Moineau-type device the helical rotor orbits in the reverse direction relative to its rotation and the helical stator surface has one thread more than the helical rotor.

The coupling between the Moineau rotor and drive shaft must utilize a universal connection to accommodate the orbital motion of the rotor, the orbital speed being equal to the speed of rotation. Various types of universal connections or couplings have been utilized including conventional universal joints, long flexible tubes etc. [Since the rotor has a cork screw shape, it is not feasible to locate the flexible coupling within the rotor and] normally coupling devices of relatively long length are used such as those disclosed in U.S. Pat. Nos. 2,512,764; 2,545,626; 2,737,119; 2,739,650 and 2,924,180.

Another technique that is used in connection with Moineau-type pumps is the provision of a flexible mounting for the helical stator as disclosed in U.S. Pat. Nos. 2,826,152; 2,862,454 and 3,667,692. This arrangement permits the rotor to be rigidly coupled to the rotary drive shaft and also avoids the use of long-length universal coupling mechanisms which greatly add to the overall size of the device. The flexible stator design, however, results in the stator, which is usually formed of elastomeric material, being vulnerable to malfunction under excessive pressure since it is able to deflect in an axial direction. Also, this type of design results in the generation of considerable heat due to the flexing of the elastomeric material and excessive heat can greatly reduce the effective life of the stator. While this flexible mounting technique may be used in connection with Allen-type devices, it would be vulnerable to the same disadvantages.

One particular application for Allen pumps is in the pumping of sewage in pressure sewage systems. In these systems, it is desirable that a grinding mechanism be utilized to comminute any solid material before it enters the pumping section. Accordingly, it is desirable to use the same rotary drive shaft for both the grinder and the pump. A typical pumping and comminuting device for use in a pressure sewage system is disclosed in U.S. Pat. No. 3,667,692. This type of device has a rotary cutter blade or grinding wheel mounted on the lower end of a vertical drive shaft below the surface of the sewage in a reservoir. Mounted on the rotor shaft immediately above the grinder head is a rotary pump unit which may be a centrifugal type pump or in the case of U.S. Pat. No. 3,667,692, a Moineau-type positive displacement pump.

In the case of the Moineau pump, since the drive shaft must extend through and below the rotor, the rotor is fixed to the shaft and the elastomeric stator is flexibly mounted with a flexible bellows type arrangement. In this particular application for a Moineau pump, the flexible stator arrangement must be utilized rather than a universal coupling between the drive shaft and the rotor because the shaft must extend through the rotor to the grinding blade unit. The flexible mounting for the stator, however, results in the disadvantages described above.

The shaft-rotor universal coupling arrangement of the present invention has many potential uses, however, it has particular utility in connection with the pressure sewage systems wherein it is combined with a comminutor.

SUMMARY OF THE INVENTION

It is among the objects of the invention to provide a positive-displacement-type helical pumping mechanism (e.g. Allen pump) with an improved means for coupling an orbital rotor to a rotary drive shaft.

Another object of the invention is to provide a coupling between a rotary drive shaft and a hollow orbital rotor for a pump of the type described wherein a universal connection is made entirely within the hollow orbital rotor.

A further object of the invention is to provide a combined rotary grinding mechanism and a positive displacement helical pump (e.g. Allen pump) wherein both the grinder mechanism and the orbital helical rotor of the pump are driven by the same rotary drive shaft.

These and other objects are accomplished by the novel construction of the invention which comprises a progressing cavity, positive displacement, rotary pumping assembly including a rotary shaft, a rotary drive for the shaft and a generally tubular stator coaxial with the rotary shaft and having an interior helical surface. Within the stator is a cooperating tubular rotor with an exterior helical surface that engages the interior helical surface of the stator to define therewith, sealed pumping cavities. Accordingly, as the rotor rotates and its axis translates in an orbit circle about the axis of the drive shaft, the pumping cavities are axially advanced.

Within the rotor, in accordance with the invention, is a flexible torque tube for coupling the rotor to the shaft, the tube being connected at one end to the shaft and at its other end to an end of the rotor to transmit driving torque to the rotor and to flex in order to accommodate the orbital movement of the rotor in an orbit circle about the axis of the shaft.

In the preferred embodiment, the drive shaft extends entirely through the helical rotor and drives at its outer end, another rotary load such as a rotary grinder for use in comminuting solid or semi-solid material to be pumped.

BRIEF DESCRIPTION OF THE DRAWINGS

FIG. 2 is a vertical section on an enlarged scale through the grinding and pumping unit of FIG. 1;

FIG. 3 is an elevational view from below of the grinding and pumping unit of FIG. 2 with parts broken away for the purpose of illustration;

FIG. 4 is a cross sectional view taken on the line 4—4 of FIG. 2;

FIG. 5 is a cross sectional view taken on the line 5—5 of FIG. 2;

FIG. 6 is a cross sectional view taken on the line 6—6 of FIG. 2;

FIG. 7 is a cross sectional view taken on the line 7—7 of FIG. 2;

FIG. 8 is a cross sectional view taken on the line 8—8 of FIG. 2;

FIG. 9 is a vertical sectional view similar to FIG. 2 showing the orbital rotor after 90° of rotation from the position shown in FIGS. 2 and 4 through 8;

FIG. 10 is a cross sectional view taken on the line 10—10 of FIG. 9; and

FIG. 11 is an exploded assembly view, partly in section, of the pumping section of the grinding and pumping unit of FIG. 9.

DESCRIPTION OF THE PREFERRED EMBODIMENT

Figure 1:
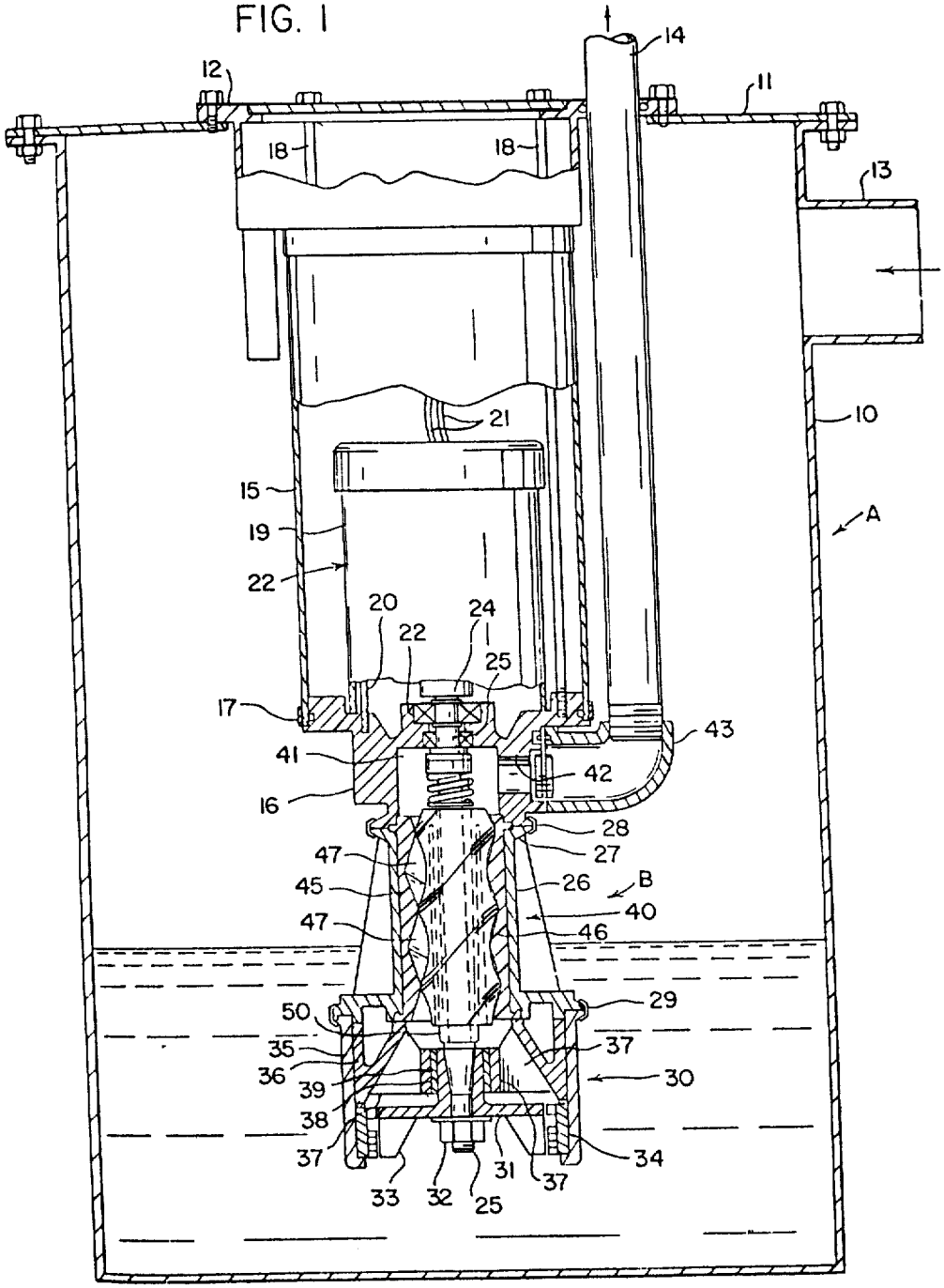
FIG. 1 is a sectional view through a sewage tank for a positive pressure sewage system that includes a grinding and pumping unit embodying the invention.

For the purpose of illustration, the invention will be described herein in connection with its adaption for use in a progressing cavity pump in combination with a grinder head and a submersible drive motor all mounted in a sealed sewage collection tank A. Referring to FIG. 1, the pump and grinder head assembly is identified generally by the letter B. The sewage collection tank A comprises part of a pressure sewage system that serves a waste generating unit and is adapted to receive sewage that is gravity fed to the sewage collection tank A and then pumped to a previously installed conventional gravity sewer system. As conventional accessories (not shown) to the unit B, a liquid level responsive on-off switch, an overflow alarm and a discharge check valve are provided in the sealed sewage collection tank A.

The tank A comprises a cylindrical upright wall 10, an annular cover plate 11 bolted to an annular flange at the top of the wall 10 and an annular mounting flange 12 bolted to the cover plate 11 and which serves as a mounting means for the grinding and pumping unit B. A three inch inlet pipe 13 connects to the gravity sewer line from the waste generating unit and a 1½ inch discharge pipe 14 carries ground sewage from the grinding and pumping unit B to a conventional gravity sewer system. The grinding and pumping unit B includes a cylindrical casing 15 and a pump head 16 connected to the casing by a clamp ring 17. The cylindrical casing 15 and pump head 16 are supported above by vertical tie bolts 18 extended downwardly through the cover plate.

Located within the cylindrical casing 15 is a cylindrical motor housing 19 anchored to the pump head 16 by tie bolts 20. Electrical power leads 21 for the motor (not shown) extend through the cover plate and are preferably protected by the casing 15 from contact with sewage in the tank.

The motor has an output shaft 23 (FIG. 3) connected at a coupling 24 to the pump shaft 25. The coupling 24 is formed of a semi-elastomeric material such as polyurethane to provide sufficient shock absorbing properties and to protect the pump shaft 25 from peak loads caused by any sudden jamming of the grinder unit. The pump shaft 25 is supported both radially and axially by a sealed, grease lubricated ball bearing unit 22.

A cylindrical pump housing 26 with an upper flange 27 is clamped to the pump head 16 by a clamp ring 28. A housing 35 for the grinder section 30 is clamped to a flange on the lower end of the pump housing 26 by another clamp ring 29.

The grinder section broadly indicated by the numeral 30 includes a cutter head 31 secured to the pump shaft by a nut 32 and having radial cutter blades 33 that cooperate with an annular stator ring 34 to grind up any semi-solid or solid material contained in the sewage being sucked upward by the pumping section 40. The stator ring 34 rests against an inwardly extending shoulder formed in the bottom of the grinder housing 35 and is held in place from above by an annular spacer element 36 which is positioned between the cutter ring 34 and the bottom flange of the pump housing 26. The spacer element 36 has inwardly extending radial ribs 37 connected to an inner sleeve that supports a stabilizing bushing 38 on a machined hub 39 for the cutter head 31.

The pumping section 40 comprises a positive displacement, progressing cavity helical pump such as an Allen pump adapted to pump the sewage upwardly therethrough to a discharge chamber 41 within the pump head 16 and having an outlet port 42 that communicates to a fitting 43 for the discharge pipe 14. The pump comprises a generally tubular stator 45 preferably formed of rubber or other resilient material and a hollow helical rotor 46 received within the stator. The stator 45 is press lifted into the pump housing and is clamped by means of a shoulder at each end together with the assembly. The stator 45 may be a molded unitary element or may be formed of two molded halves.

The rotor 46 has an exterior helical surface with a generally eliptical form as viewed in transverse cross section. The helical rotor surface has one more thread than the helical stator surface which it engages to define sealed pumping cavities 47 and the threads have a lead that is equal to the number of threads in the rotor 46 times the lead of the helical surface of the stator 45. Accordingly, as the rotor 46 rotates and its axis translates in an orbit circle about the axis of the pump shaft 25 the pumping cavities are axially advanced.

In accordance with the invention, the rotor 46 is coupled to the pump shaft 25 by a flexible torque tube 50 connected at one end to the shaft 25 and at the other end to the rotor 46. The tube 50 is adapted to flex as necessary in order to accommodate the orbital movement of the rotor 46 in the orbit circle about the axis of the shaft 25. As indicated, the pump shaft 25 extends entirely through the helical rotor 46 and the flexible torque tube 50 is located generally within the hollow rotor and surrounds the shaft 25. It will be seen (FIGS. 4 through 8) that the pumping cavities 47 progress from a sealed end to a maximum cross section and then diminish to a sealing point. In the embodiment of the invention illustrated herein, the cavities 47 extend four-fifths the length of the rotor 46 and stator 45 or in other words, the rotor and stator are 1¼ cavity lengths long.

The rotor and stator geometry and mathematical relationships are described in detail in my U.S. Pat. No. 3,512,904 which is made a part hereof and incorporated by reference herein.

A helical rotor 46 may be molded as shown in the drawing of polyurethane or other material selected for flexibility, strength, wear and abrasion resistance and low friction characteristics. If the rotor is molded, the flexible torque tube 50 may be molded integrally with the rotor, as shown, and of the same material, the tube 50 being joined to the rotor 46 at the upper portion thereof. The lower end of the tube 50 is bonded to the pump shaft 25; alternatively, the lower end of the tube 50 may be mechanically clamped to the shaft 25. If desired, the rotor may be formed from metal tubing as described in my aforesaid patent, provided with a wear resistant coating, and then bonded to a separately formed torque tube composed of a material having the desired physical characteristics, such as high density polyurethane. As before, the lower, opposite end of the torque tube may be bonded or clamped to the pump shaft 25.

The stator 45 may be molded, for example, of BUNA-N rubber in a multiple cavity mold and clamped in place at assembly. Typical dimensions for the helical positive displacement helical pump illustrated herein are given in TABLE I below.

TABLE I

| Pump Dimension | (Inches) |
|---|---|
| Eccentricity | .1 |
| Cavity length | 3.2 |
| Rotor major dia | 1.75 |
| Rotor minor dia | 1.35 |
| Rotor form length | 4.25 |
| Stator major inside dia | 1.95 |
| Stator minor inside dia | 1.55 |
| Stator outside dia | 2.25 |
| Stator length | 4.00 |
| Stator/cavity length ratio | 1.25 |

A pump designed to these dimensions will have a displacement of 16½ gallons per minute at a shaft speed of 1725 rpm.

The rubber stator 45 provides a semi-positive characteristic for the unit so that it is capable of being "dead ended" without risk of bursting the lines or destroying the pump. This is an automatic safety feature in case of a severely blocked discharge.

While the invention has been shown and described with reference to a specific embodiment thereof, this is intended for the purpose of illustration rather than limitation and other modifications and variations of the specific form herein shown and described will be apparent to those skilled in the art all within the intended spirit and scope of the invention. Accordingly, the patent is not to be limited in scope and effect to the specific form herein shown and described nor in any way that is inconsistent with the extent to which the progress in the art has been advanced by the invention.

I claim:

1. In a progressing-cavity, positive displacement rotary pump assembly including a rotary shaft and drive means therefor, a generally tubular stator coaxial with said rotary shaft and having a helically formed interior surface with n–1 threads, a rotor located within said stator and having a helically formed exterior surface engaging said interior surface of said stator to define therewith, sealed pumping cavities, said exterior rotor surface having n threads and a lead of n times the lead of said interior stator surface, the improvement which comprises:

a flexible tubular member *surrounding at least a portion of said shaft whereby said shaft extends through said flexible tubular member and through said rotor* for coupling said rotor to said shaft, one end of said member being rigidly connected to said shaft and the other end thereof being rigidly connected to said rotor to transmit driving torque to said rotor and to flex to accommodate orbital movement of said rotor during rotation thereof.

2. A submersible grinder pump for comminuting and pumping semi-fluid material from a reservoir, comprising:

a stationary housing assembly, a rotary shaft with a generally vertical axis, a rotary drive means for said shaft operatively connected to the upper end thereof, rotary grinding means operatively connected to the lower end of said shaft for grinding and comminuting said semi-fluid material, a progressive-cavity, positive displacement helical pump including a generally tubular stator mounted to said housing and having an interior helical surface and a hollow rotor operatively connected to said shaft above said grinding means within said stator and having a double helical surface, and a flexible torque tube extending through said rotor around said shaft, said tube being rigidly connected at one end to said shaft and at the other end to said rotor whereby said rotor is turned by said shaft while the rotor axis moves in an orbit about the shaft axis to define with said stator axially advancing pumping cavities for forcing fluid material from said grinder portion, under pressure from said reservoir.

3. In a progressing-cavity, positive displacement rotary pump assembly including a rotary shaft and drive means therefor, a generally tubular stator coaxial with said rotary shaft and having a helically formed interior surface, a *hollow tubular* rotor located within said stator and having a helically formed exterior surface engaging said interior surface of said stator to define therewith sealed pumping cavities, the improvement which comprises:

a *tubular* flexible member *surrounding said shaft whereby said shaft extends through said flexible member and said rotor,* for coupling said rotor to said shaft, one end of said member being rigidly connected to said shaft and the other end thereof being rigidly connected to said rotor to transmit driving torque to said rotor and to flex to accommodate orbital movement of said rotor during rotation thereof.

4. A pump assembly as defined in claim 3 wherein [said rotor is tubular and] said flexible member is located within said rotor.

[5. A pump assembly as defined in claim 3 wherein said rotor and said flexible member are tubular and said shaft extends through said rotor and said flexible member.]

6. A pump assembly as defined in claim [5] *3* wherein said shaft extends through and beyond said rotor and wherein said flexible member is positioned entirely within said rotor.

7. A pump assembly as defined in claim 3 wherein [said rotor is tubular and] said flexible member is formed integrally with said rotor.

8. A pump assembly as defined in claim 7 wherein the outer end of said shaft extending beyond said rotor is connected to a separate rotary load, said shaft being adapted to drive said rotor and said separate rotary load simultaneously.

9. A pump assembly as defined in claim 7 wherein said flexible member is secured to said shaft adjacent the end of said rotor furthest from said drive means for said shaft.

10. A pump assembly as defined in claim 9 wherein said rotary load is a mechanism for grinding and comminuting solid and semi-solid material contained in the product to be pumped.

* * * * *